Patented Nov. 18, 1952

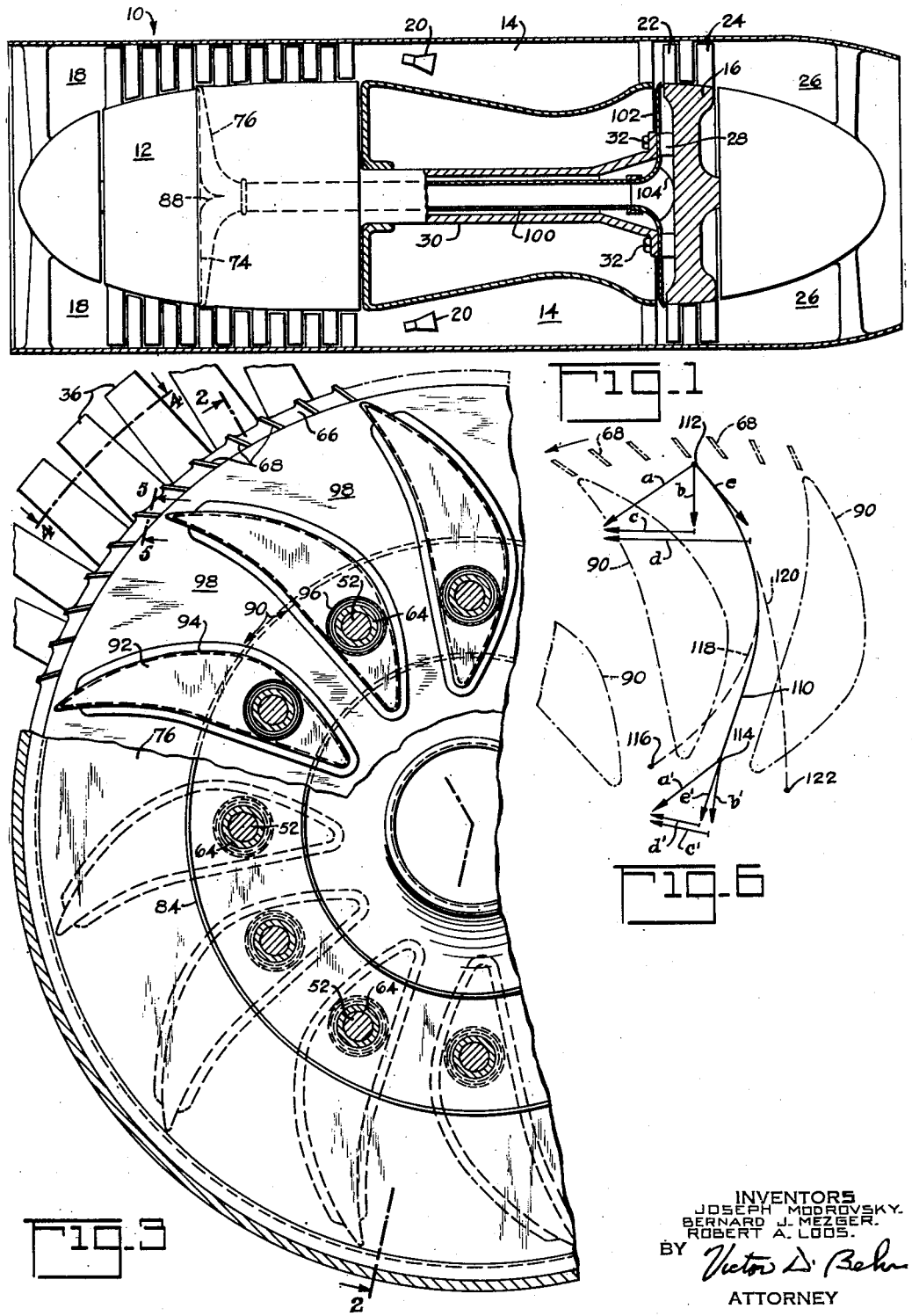

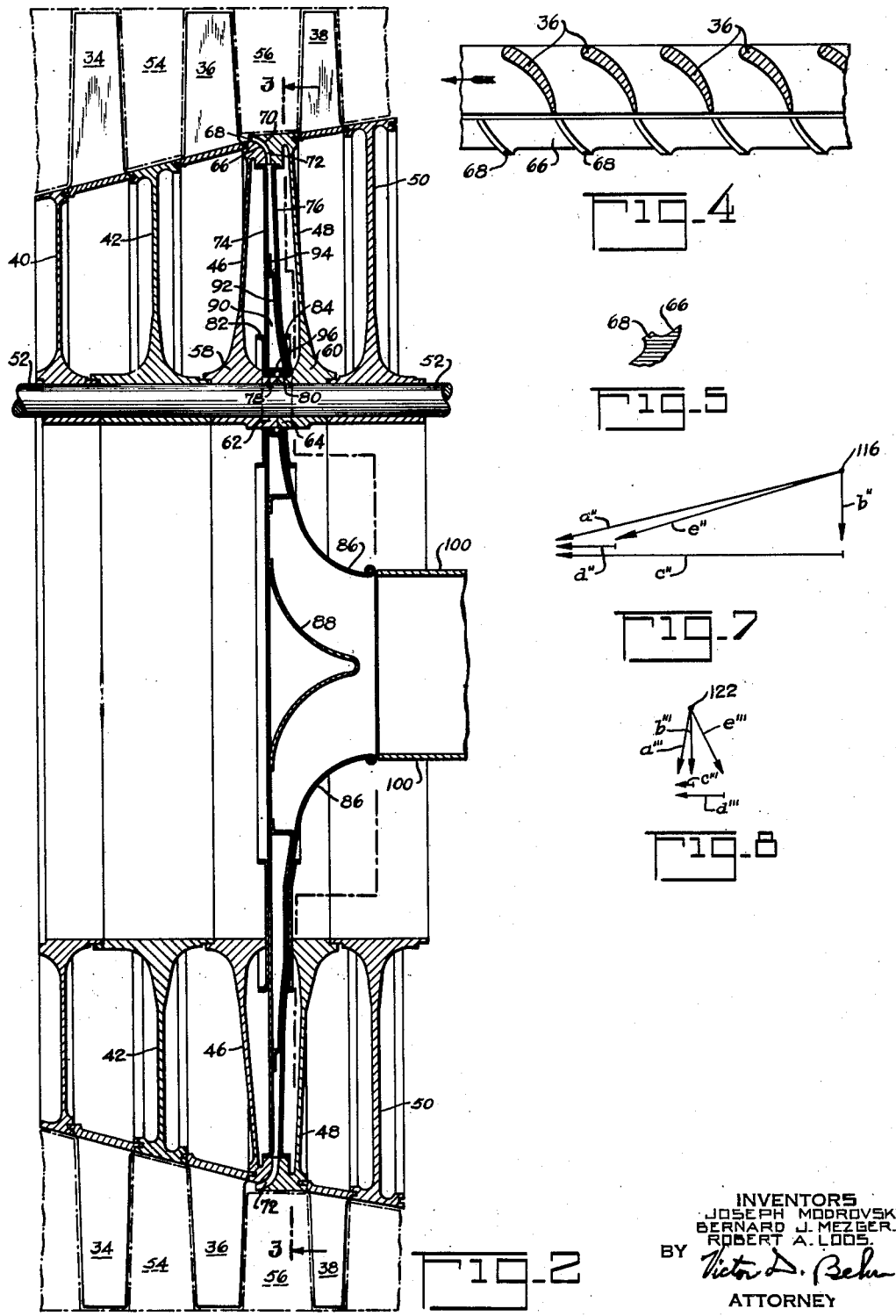

2,618,433

UNITED STATES PATENT OFFICE 2,618,433

MEANS FOR BLEEDING AIR FROM COMPRESSORS

Robert A. Loos, Packanack Lake, and Bernard J. Mezger, Riverdale, N. J., and Joseph Modrovsky, Flushing, N. Y., assignors to Curtiss-Wright Corporation, a corporation of Delaware Application June 23, 1948, Serial No. 34,746

5 Claims. (Cl. 230—122)

This invention relates to compressors and is more particularly directed to novel means for bleeding off air from an intermediate stage of a compressor. In addition, said invention is directed to means for utilizing said bleed air for cooling a gas turbine drivably connected to said compressor, said turbine and compressor comprising components of a gas turbine power plant.

A gas turbine power plant includes a combustion chamber, an air compressor, and a turbine rotor, said compressor being arranged to be driven by the turbine rotor for supplying said combustion chamber with compressed air for combustion therein. The efficiency and power output of such power plants increases with increase in the temperature of the turbine combustion gases at the inlet to the turbine rotor. By providing means for cooling the turbine rotor, it is possible to operate at higher combustion gas temperatures, thereby increasing the turbine efficiency and the available power.

An object of the present invention comprises the provision of a gas turbine power plant in which the turbine rotor is cooled by air supplied by the compressor of said power plant. In accordance with the present invention, the turbine rotor cooling air is supplied from its compressor inwardly into the compressor rotor and thence into a hollow shaft drivably connecting the turbine rotor to said compressor. A further object of this invention comprises the provision of a novel arrangement for bleeding off air from the compressor into the interior thereof.

The air for cooling a turbine rotor need only have a small above-atmospheric pressure sufficient to overcome the flow resistance of the cooling air flow path—for example an above-atmospheric pressure of 4 to 6 pounds p. s. i. has been found satisfactory in a particular gas turbine power plant. However, the delivery pressure of the compressor of the gas turbine power plant may be as much as 8 or more times atmospheric pressure. Accordingly it is desirable to bleed off said cooling air from a suitable intermediate stage of the compressor. This fact makes the invention particularly applicable to multi-stage axial flow compressors.

The most convenient place for bleeding off air from an intermediate stage of a multi-stage axial flow compressor, is directly downstream of a stage of rotor blades. However, directly downstream of any stage of rotor blades the air velocity is quite high so that unless means are provided to recover or utilize the kinetic energy of the bleed air, said energy will be lost. Obviously, it is theoretically possible to convert the velocity head of the bleed air to pressure head by a diffuser construction, that is, by gradually expanding said bleed air. Because of structural and space limitations, however, the incorporation of such a diffuser within the rotor of an axial flow compressor is not practical. Applicants have solved this problem by providing bleed air passageways disposed within and rotatable with the compressor, said passageways being so shaped that the velocity of the bleed air is reduced by using some of the energy of said air to help drive the compressor.

Other objects of the invention will become apparent upon reading the annexed detailed description in connection with the drawing in which:

Figure 1 is a schematic view partly in section of a gas turbine power plant embodying the invention;

Figure 2 is an enlarged axial sectional view of a portion of Figure 1;

Figure 3 is a sectional view taken along line 3—3 of Figure 2;

Figure 4 is a sectional view taken along line 4—4 of Figure 3;

Figure 5 is a sectional view taken along line 5—5 of Figure 3;

Figure 6 is a vector diagram illustrating various air and rotor velocities at the inlet and outlet ends of a radial air bleed passageway in the compressor;

Figure 7 is a vector diagram illustrating various air and rotor velocities at the outlet end of a radial air bleed passageway in the compressor when said air bleed passageway is designed so that energy is neither extracted from nor added to the air as it flows along said passageway; and Figure 8 is a vector diagram illustrating air and rotor velocity conditions at the outlet end of a radial air bleed passageway of the compressor for a still further change in the flow path of said passageways.

Referring to the drawing, a gas turbine power plant 10 is schematically illustrated as comprising an air compressor 12, a combustion chamber 14 and a turbine rotor disc 16. The compressor has an annular inlet opening 18 and is arranged to compress air into the combustion chamber 14 for combustion therein of fuel supplied thereto through nozzles 20. The combustion gases are directed against the blades 22 and 24 of the turbine rotor 16 for driving said rotor, said gases discharging rearwardly from said rotor through a discharge duct 26. The turbine rotor is provided with a plurality of circumferentially spaced bosses 28 to which a hollow shaft 30 is secured by screws 32, the other end of said shaft being drivably connected to the compressor 12. As so far described, the gas turbine power plant 10 is conventional and comprises a so-called turbo-jet engine for aircraft. Obviously, however, the invention is not limited to this specific type of gas turbine power plant.

Preferably, the compressor 12 is a multi-stage axial flow compressor and may comprise a plurality of discs clamped together by bolts, the compressor rotor blades being secured between the rim portions of said discs. Such a compressor construction is fully disclosed in the copending application of F. P. Sollinger et al., Serial No. 740,576, filed April 10, 1947. A portion of such a compressor is illustrated in Figure 2.

In Figure 2, three intermediate stages of compressor rotor blades 34, 36, and 38 are secured in position by rotor discs 40, 42, 46, 48, and 50, said discs all being provided with peripheral grooves in which tongues on the rotor blades are received. The compressor rotor discs are all clamped together by a plurality of circumferentially spaced bolts 52. In Figure 2, compressor stator blades 54 and 56 have been indicated, by dash lines, between the three stages of rotor blades 34, 36, and 38.

Except for the discs 46 and 48, the compressor rotor discs have annular interfitted hubs abutting both of their respective adjacent discs, said hubs being held together by the clamping bolts 52. The discs 46 and 48 have annular hubs 58 and 60 respectively abutting the hubs of the adjacent discs 44 and 50. However, on its side facing the rotor disc 48, the rotor disc 46 has a plurality of circumferentially spaced bosses 62 abutting corresponding bosses 64 on the disc 48 and through which the bolts 52 extend. With this construction, the annular space between the compressor rotor discs 46 and 48 communicates with the hollow interior of the compressor rotor through the spaces between adjacent pairs of bosses 62 and 64.

The compressor rotor discs 46 and 48 also differ from the other compressor rotor discs in that the abutting surfaces of their rims are formed to provide passageways leading from a point immediately downstream of the rotor blades 36 to the annular space between said discs. Thus, the rim surface 66 of the disc 46, adjacent the disc 48, is convex and has a plurality of ribs 68 projecting therefrom, each axial section of said convex surface subtending an angle of approximately 90°. Adjacent the trailing edge of the compressor rotor blades 36, the ribs 68 project radially outwardly and they extend along said convex surface in a direction tangent to the trailing edge of the blades 36. The outer edges of the ribs 68 abut a concave surface 70 on the adjacent disc 68, said concave and convex surfaces being substantially parallel. With this construction, the spaces between the ribs 68 comprise a plurality of passageways 72, leading into the annular space between the rotor discs 46 and 48 from a point adjacent the trailing edges of the rotor blades 36, said passageways bleeding off air from the trailing edges of said rotor blades.

With the ribs 68 constructed as illustrated in Figures 3, 4, and 5, they serve to convert the axial component of the velocity of said bleed air, at the entrance to the passageways 72, to a radial component, at the discharge end of said passageways, without changing the tangential component of said velocity. Thus, as viewed in Figure 3, each rib 68 is inclined to a radial direction by an angle equal to the angle the trailing edge of each blade 36 makes with the axial direction. Because of the curved nature of the surface from which the ribs 68 project, said ribs appear curved in Figure 4.

Between the compressor rotor discs 46 and 48, there is clamped a pair of axially spaced sheet metal plates 74 and 76. Said plates 74 and 76 are disposed so that the bleed air flowing through the passageways 72 flows radially inwardly between said plates. The plates 74 and 76 extend past the bosses 62 and 64 into the hollow interior of the compressor rotor. Thus the plate 74 is provided with a plurality of circumferentially spaced holes each having an annular flange 78 fitted about a boss 62. Similarly the plate 76 has a plurality of circumferentially spaced holes having annular flanges 80 fitting about their respective bosses 64. The plates 74 and 76 are also provided with annular reinforcing plates 82 and 84 disposed adjacent the bosses 62 and 64 respectively.

The plates 74 and 76 are formed so that air flowing inwardly therebetween is turned axially into the hollow interior of the compressor rotor toward its discharge end. To this end, the plate 76 is annular, said plate having a central cylindrical opening 86 smoothly merging with its radial portion and extending co-axially toward the discharge end of the compressor rotor. The plate 74 is not annular but is a solid disc and is provided with a conical member 88 co-axially secured thereto with its apex extending toward the cylindrical opening 86 of the plate 76. A plurality of sheet metal guide vanes 90 are secured to and disposed between the plates 74 and 76. As illustrated, each guide vane 90 comprises a central portion 92 lying against the annular plate 76 and having a peripheral flange 94 extending toward and lying against the other annular plate 74. In addition, each guide vane 90 has a central opening with an annular flange 96 disposed about a pair of the plate flanges 78 and 80 through which a pair of bosses 62 and 64 extend. The guide vanes 90 divide the annular space between the plates 74 and 76 into a plurality of curved passageways 98 extending from the peripheral passageways 72 into the hollow interior of the compressor rotor. The abutting surfaces of the various plates 74, 76, 82, and 84, and the guide vanes 90 are secured together, for example by welding.

A duct 100 is co-axially supported within the hollow turbine shaft 30, said duct forming a continuation of the cylindrical portion 86 of the plate 76 and terminating adjacent to the turbine rotor disc 16. An annular plate 102 is secured to the turbine rotor disc 16 by the screws 32 and is spaced from the face of said disc by the bosses 28, the plate 102 having a central opening smoothly merging with the duct 100.

With the aforedescribed construction, some air is bled off from the trailing edge of the compressor rotor blades 36 through the passageways 72 and thence into the interior of the compressor rotor through the passageways 98. From the passageways 98, the bleed air flows through the central opening 86 into the duct 100 toward the turbine rotor disc 16 and thence said air flow radially outwardly between the turbine rotor disc 16 and the plate 102. At the periphery of the turbine rotor disc 16, said bleed air may flow between the root ends of the turbine rotor blades for cooling the periphery of the turbine disc 16. A suitable construction whereby cooling air may flow between the root ends of the turbine rotor blades is disclosed in the copending application of F. P. Sollinger, Serial No. 696,287, filed September 11, 1946. The rotor blades 22 may have hollow construction so that said relatively cool bleed air may be introduced into said hollow blades for cooling flow therethrough. A hollow rotor blade construction for this purpose is disclosed in another copending application of F. P. Sollinger, Serial No. 19,743, filed April 8, 1948.

If desired, suitable circumferentially-spaced radial blades 104 may be provided between the rotor disc 16 and the plate 102 to comprise a centrifugal pump to help the flow of said cooling air. When the air bled from the compressor is introduced into hollow turbine rotor blades for flow therethrough into the adjacent turbine combustion gases, such a centrifugal pump may be necessary in order to pump said air out through said hollow rotor blades into and against the pressure of said combustion gases. In addition, in order to obtain the necessary pressure to cause said bleed air to flow out through hollow turbine blades, it may also be necessary to increase the pressure of the bleed air within the compressor rotor by bleeding air from a higher compression stage.

The passageways 98 are shaped so that the air flowing therethrough helps to rotate the compressor 12. In this way the velocity of said bleed air is reduced thereby utilizing some of its kinetic energy which would otherwise be wasted. This feature of the invention may best be understood by reference to Figures 6, 7, and 8.

In Figure 6, the solid line 110 represents the mean radial flow path of a passageway 98 formed between a pair of guide vanes 90. At a point 112 on said mean flow path 110, at the entrance or radially outer end of its passageway 98, the vectors $a$, $b$, and $c$ respectively represent the absolute velocity of the bleed air, the radial component of said absolute velocity and the tangential component of said absolute velocity. In addition, the vector $d$ represents the tangential velocity of the compressor rotor at the point 112 and the vector $e$ represents the velocity of the bleed air at the point 112 relative to the compressor rotor. As illustrated, the velocity $e$, of the bleed air relative to the compressor rotor at the point 112, is parallel to the adjacent ribs 68. This follows from the fact that the passageways 72 formed by the ribs 68 merely turn the bleed air from an axial flow path to a radially flow path without changing its tangential component. As also illustrated in Figure 6, the inlet end of the mean flow path 110 is tangent to the direction of said relative bleed air velocity $e$, whereby said bleed air flows into the passageways 98 in a direction tangent to their mean flow paths.

At a point 114, at the radially inner or discharge end of the mean flow path 110 of a passageway 98, the velocities corresponding to those at the point 112 have been indicated by the same but primed reference letters. Obviously the tangential velocity $d'$ of the compressor rotor at the point 114 is reduced from its value $d$ at the point 112 by the ratio of the radii of said two points. Assuming that there is no appreciable difference in the radial velocity components $b$ and $b'$ of the bleed air, then it is at once apparent from Figure 6 that with the guide vanes 90 shaped to provide the mean flow path 110, there has been an appreciable reduction in the absolute velocity of the bleed air. That is $a'$ is less than $a$.

The angular momentum of the bleed air at some point along a passageway 98 is equal to the tangential component of its absolute velocity at said point multiplied by the radius of the rotor 12 at said point. Since the tangential velocity of any point on the rotor 12 is proportional to the radius of said point, the angular momentum of the bleed air at the entrance to a passageway 98 is proportional to the product $cd$ and the angular momentum of the bleed air at the discharge end of a passageway 98 is proportional to the product $c'd'$, where $c$, $d$, $c'$ and $d'$ have the meanings previously defined. It is apparent from Fig. 6 that the product $cd$ is considerably larger than the product $c'd'$ so that there is a substantial reduction in the angular momentum of said bleed air in flowing from the entrance to the discharge end of a passageway 98. Since the angular momentum of said bleed air has been decreased a force must have been applied to said bleed air by the rotor in a direction opposite to the angular momentum of said bleed air. Therefore in flowing from the entrance to the discharge end of a passageway 98, the bleed air must apply an equal and opposite force to the rotor in the direction of the angular momentum of said air whereby said reduction in angular momentum and the accompanying reduction of the energy of said air has been utilized to help rotate the rotor 12.

If the guide vanes 90 for the passageway 98 were designed so that no energy was extracted from or added to the bleed air as it flows through said passageway, then the angular momentum of said bleed air at the discharge end 116 of said modified passageway would be substantially equal to its value at the inlet end of said passageway. The various velocity conditions at the discharge end 116 of such a modified passageway 98 are indicated in Figure 7 in which said various velocities have been designated by the same reference letters employed in Figure 6 for the corresponding velocities but with a double prime mark affixed thereto. Thus, in Figure 7, $d''$ is the tangential velocity of the compressor rotor at the discharge end 116 of said modified passageway 98. Since the points 114 and 116 are at the same radial distance from the axis of the compressor, $d''$ is equal to $d'$. Also, $c''$ is the tangential component of the absolute velocity $a''$ of the bleed air at the discharge end 116 of said modified passageway 98. If no work is extracted from or added to said bleed air as it flows along said modified passageway 98, then the product $c''d''$ is equal to the product $cd$. Accordingly, for this no work condition, the mean flow path of said modified passageway 98 would have to bend around to the point 116 as indicated by the dash line 118 in Figure 6.

If the passageway 98 were designed to have a mean flow path indicated by the dash line 120 then the various velocities at the discharge end 122 of such a passageway would be as represented in Figure 8. In Figure 8 the velocities corresponding to those of Figures 6 and 7 are represented by the same reference letters but in Figure 8 a triple prime mark has been added to said letters.

As is apparent in Figure 8, the absolute velocity $a'''$ at the discharge end 122 of a modified passageway 98, having a flow path corresponding to the dash line 120, is even less than the absolute velocity a' for the passageway 98 having a mean flow path 110. The greater the decrease in the absolute velocity of the bleed air as it flows through the passageway 98, the larger is the quantity of work extracted from said air and the smaller is the resulting pressure of said air at the entrance to the duct 100 within the compressor rotor. This latter pressure should be sufficient to overcome the flow resistance of the cooling air flow path. If the discharge end of the mean flow path 110 of a passageway 98 is shifted toward the path 120, then more work is extracted from said air and there is a larger reduction in its absolute velocity. However the pressure of said bleed air within the compressor may then become too low. On the other hand if the discharge end of said mean flow path 110 is shifted toward the mean flow path 118, then less work is extracted from said bleed air and the absolute velocity of said air may become so large as to represent an excessive loss of kinetic energy. Accordingly, the actual mean flow path 110 for each passageway 98 represents a compromise between these factors. As is apparent in Figure 6, the discharge end of each passageway 98 is turned toward a more radial direction from the inclination of said passageway at its inlet end. Or, viewed somewhat differently, the discharge end of a passageway 98 is turned toward the direction of rotation of the compressor rotor relative to the direction of said passageway at its inlet end.

The particular compression stage of the compressor 12 selected for bleeding off air depends on the bleed air pressure required inside the compressor rotor for circulating said relatively cool bleed air in heat exchange relation with the turbine rotor 16. As previously mentioned, a pressure of 4 to 6 pounds p. s. i. within the compressor rotor has been found satisfactory in a particular gas turbine power plant. A compression stage is selected at which the static pressure of the compressor air is somewhat larger than the pressure of the bleed air required inside the compressor rotor. However, since the decrease in the bleed air pressure, as it flows into the compressor rotor through the passageways 98, depends on the shape of the mean flow path of said passageways, the particular compression stage selected, from which air is bled off, also depends on the shape of said mean flow path. The air bled from the trailing edge of the selected compressor rotor blades, flows into the compressor rotor through the passageways 72 and 98. In its flow through the passageways 98 the pressure and absolute velocity of said bleed air are reduced by using some of the energy of the bleed air to help drive the compressor rotor. The arrangement is such that low velocity air at the desired pressure is made available inside the compressor rotor for cooling the turbine.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications.

We claim as our invention:

1. In a multi-stage fluid compressor having a hollow rotor from which the compressor rotor blades project radially outwardly; a plurality of circumferentially-spaced passageways formed in said rotor and extending radially inwardly from the periphery of said rotor, each of said passageways communicating with an intermediate compression stage of the compressor for bleeding off a portion of the compressor fluid and for supplying said bleed fluid inwardly into the interior of said hollow rotor and each of said passageways having its radially outer end directed substantially parallel to the direction of the entering velocity of said bleed fluid relative thereto and, as viewed in the direction of flow therethrough, having its radially inner end turned toward the direction of rotation of said rotor relative to its radially outer end.

2. In a multi-stage fluid compressor having a hollow rotor from which the compressor rotor blades project radially outwardly, said rotor including a pair of co-axial annular members forming an annular space therebetween radially inwardly of the root ends of the adjacent rotor blades; and a plurality of circumferentially-spaced guide vanes secured to at least one of said annular members and dividing said annular space into a plurality of passageways providing communication between the radially inner and outer portions of said annular space, each of said passageways communicating with an intermediate compression stage of the compressor for bleeding off a portion of the compressor fluid and for supplying said bleed fluid inwardly into the interior of said hollow rotor and each of said passageways having its radially outer end directed substantially parallel to the direction of the entering velocity of said bleed fluid relative thereto and, as viewed in the direction of flow therethrough, having its radially inner end turned toward the direction of rotation of said rotor relative to its radially outer end.

3. In a multi-stage fluid compressor having a hollow rotor from which the compressor rotor blades project radially outwardly, said rotor comprising a plurality of co-axial annular members secured together, an adjacent pair of said annular members having abutting rim portions defining circumferentially-spaced passageways for bleeding off a portion of the compressor fluid, each of said passageways having one end directed upstream into and substantially parallel to the path of the compressor fluid at an intermediate stage of its compression and having its other end turned radially inwardly into the annular space between said members; and a plurality of circumferentially-spaced guide vanes secured to said members and dividing said annular space into a plurality of passageways providing communication between the radially inner and outer portions of said annular space for flow of said bleed fluid therethrough, each of said inter-vane passageways having its radially outer end directed substantially parallel to the direction of the entering velocity of said bleed fluid relative thereto and, as viewed in the direction of flow therethrough, having its radially inner end turned toward the direction of rotation of said rotor relative to its radially outer end.

4. In a multi-stage fluid compressor having a hollow rotor from which the compressor rotor blades project radially outwardly; said rotor including means providing a plurality of circumferentially-spaced first passageways disposed between the root ends of the rotor blades of a pair of intermediate stages of said rotor blades, each of said passageways having one end directed upstream into and substantially parallel to the path of the compressor fluid and having its other end turned radially inwardly into an annular space within said rotor; said rotor also having means including a plurality of circumferentially-spaced guide vanes dividing said annular space into a plurality of second passageways providing communication between the radially inner and outer portions of the annular space for flow of said bleed air therethrough, each of said inter-vane passageways having its radially outer end directed substantially parallel to the direction of the entering velocity of said bleed fluid and, as viewed in the direction of flow therethrough, having its radially inner end turned toward the direction of rotation of said rotor relative to its radially outer end.

5. In a multi-stage fluid compressor having a hollow rotor from which the compressor rotor blades project radially outwardly, said rotor comprising a plurality of co-axial annular members and a plurality of bolts clamping said members together; a plurality of circumferentially-spaced first passageways each having one end directed upstream into and substantially parallel to the path of the compressor fluid at an intermediate stage of its compression and each having its other end turned radially inwardly into the annular space between an adjacent pair of said co-axial members; and a plurality of circumferentially-spaced guide vanes through which said bolts extend, each of said guide vanes being secured to at least one of said pair of members and dividing said annular space into a plurality of second passageways providing communication between the radially inner and outer portions of said annular space for flow of said bleed air therethrough, each of said inter-vane passageways having its radially outer end directed substantially parallel to the direction of the entering velocity of said bleed fluid and, as viewed in this direction of flow therethrough, having its radially inner end turned toward the direction of rotation of said rotor relative to its radially outer end.

ROBERT A. LOOS.
BERNARD J. MEZGER.
JOSEPH MODROVSKY.

REFERENCES CITED

The following references are of record in the file of this patent:

UNITED STATES PATENTS

| Number | Name | Date |
| --- | --- | --- |
| 874,356 | Carnt et al. | Dec. 17, 1907 |
| 1,368,751 | Rateau | Feb. 15, 1921 |
| 1,960,810 | Gordon | May 29, 1934 |
| 2,211,857 | Kroon | Aug. 20, 1940 |
| 2,405,768 | Stalker | Aug. 13, 1946 |
| 2,501,614 | Price | Mar. 21, 1950 |
| 2,520,697 | Smith | Aug. 29, 1950 |

FOREIGN PATENTS

| Number | Country | Date |
| --- | --- | --- |
| 665,762 | Germany | Oct. 3, 1943 |